(12) United States Patent
Omiya et al.

(10) Patent No.: US 6,234,815 B1
(45) Date of Patent: May 22, 2001

(54) ROTARY JOINT FOR FLUID (75) Inventors: Junji Omiya; Masato Wada, both of Osaka (JP)

(73) Assignee: Nippin Pillar Packing Co., Ltd., Osaka (JP)

( * ) Notice: Subject to any disclaimer, the term of this patent is extended or adjusted under 35 U.S.C. 154(b) by 0 days.

(21) Appl. No.: 09/331,413

(22) PCT Filed: Oct. 30, 1998

(86) PCT No.: PCT/JP98/04953

§ 371 Date: Jun. 21, 1999

§ 102(e) Date: Jun. 21, 1999

(87) PCT Pub. No.: WO99/24219

PCT Pub. Date: May 20, 1999

(30) Foreign Application Priority Data

Nov. 7, 1997 (JP) .................................................... 9-305786

(51) Int. Cl.$^7$ ........................................................ H01R 4/60
(52) U.S. Cl. ............................. 439/191; 451/8; 451/287; 451/446
(58) Field of Search ................................... 464/18; 451/8, 451/41, 60, 287, 288, 446; 439/190, 191, 196; 285/41, 190, 121.3, 121.6

(56) References Cited

U.S. PATENT DOCUMENTS

| 4,272,924 | * | 6/1981 | Masuko et al. ................. 451/41 X |
| 4,765,096 | | 8/1988 | Lang . |
| 5,044,970 | * | 9/1991 | Reuter ................................ 439/196 |
| 5,110,162 | * | 5/1992 | Peter et al. ................. 285/121.3 X |
| 5,498,163 | * | 3/1996 | Takamura et al. ............. 439/190 X |
| 5,921,851 | * | 7/1999 | Suzuki et al. ................. 451/50 X |
| 6,010,391 | * | 1/2000 | Lewellen et al. ................. 451/35 |

FOREIGN PATENT DOCUMENTS

| 57-75777 | | 5/1982 | (JP) . |
| 1364448 | * | 1/1988 | (SU) .................................... 451/288 |

* cited by examiner

Primary Examiner—Lynne H. Browne
Assistant Examiner—Greg Binda
(74) Attorney, Agent, or Firm—Griffin & Szipl, P.C.

(57) ABSTRACT

A rotary joint for fluids that provides a completely sealed path for the flow of polishing solution and which permits the supply of electricity to a polished surface detector. The rotary joint of the present invention is essentially made up of a joint block (1) and a rotator assembly (2). To the rotator assembly (2) rotatably held in the joint block (1) is attached a polishing pad shaft (104). Between the joint block (1) and the rotator assembly (2) is formed a seal space closed by a pair of seal units (5, 5), each comprising sealing rings (51, 52) which rotate in relation to each other. A fluid passage (7) continuous via a seal space (50) and running through the joint block (1) and the rotator assembly (2) is formed, and a wiring conduit running from an electric source unit (3) to the polished surface detector on the polishing pad (104) is also formed. The wiring conduit comprises a rotary connector unit (4) made up of a casing (40) and a first connector (41) supported by the rotator assembly (2) and a second connector (42) held by the joint block (1) with the two connectors (41, 42) electrically connected to each other and relatively rotatable, electric wiring (42a) running from the power unit (3) to the second connector (42), and electric wiring (41a) running from the first connector (41) to the polished surface detector (110) through a wiring conduit (24) formed in the rotator assembly (2).

6 Claims, 5 Drawing Sheets

ROTARY JOINT FOR FLUID

BACKGROUND OF THE INVENTION

1. Field of the Invention

The present invention relates to rotary joints for fluids, and more specifically to rotary joints which allow solid-liquid mixture fluids, including slurry fluids (such as polishing solutions for polishing the surface of a silicon wafer by a chemical mechanical polishing technique, CMP for short) and corrosive fluids, to flow through the relatively rotating components and which can be connected to a monitoring apparatus for checking the polished surface state of the silicon wafer.

2. Description of the Prior Art

Figure 5:
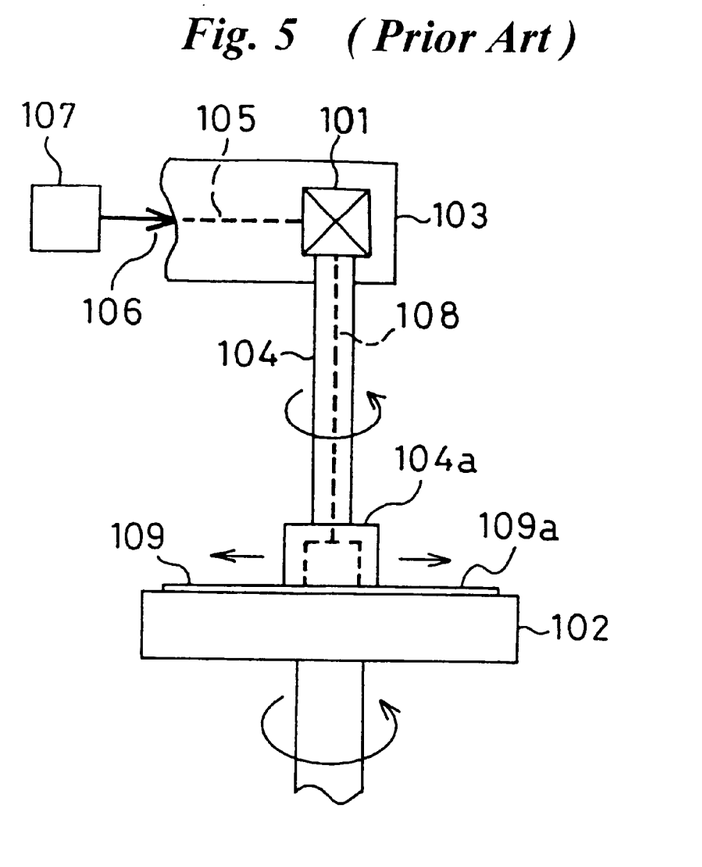
FIG. 5 is a side view of a surface polishing apparatus equipped with a prior art typical rotary joint.
Figure 6:
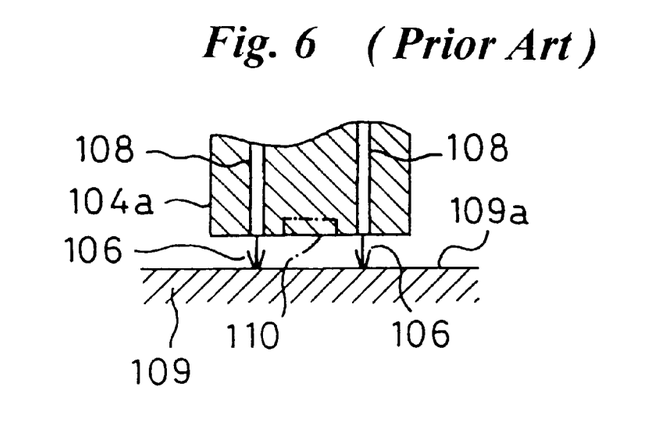
FIG. 6 is a vertical, sectional view showing the core part of the apparatus shown in FIG. 5.

An apparatus for polishing the surface of silicon wafer by CMP to which this invention relates was recently developed. The apparatus, as shown in FIGS. 5 and 6, comprises: a rotary table 102 that rotates horizontally; a pad shaft support block 103 which moves back and forth and up and down; a polishing pad shaft 104 which, held by the shaft support block 103, is forced to rotate; a slurry fluid feeding and discharge passage 105 formed on the non-rotary side in the pad shaft support block 103; a polishing solution feeding and discharge mechanism 107 connected to the slurry fluid feeding and discharge passage 105 for feeding and discharging a polishing solution 106, for example, a KOH-containing silica slurry to which isopropyl alcohol is added; a slurry fluid feeding and discharge passage 108 on the rotary side which runs through the polishing pad shaft 104 and opens under a pad head 104a; and a rotary joint 111 which, installed between the pad shaft support block 103 and the polishing pad shaft 104, connects the two slurry fluid feeding and discharge passages 105 and 108 in a way that the two passages 105 and 108 communicate with each other and are relatively rotatable.

In that surface polishing apparatus, the silicon wafer 109 is polished in this manner. First, the silicon wafer 109 is held on the rotary table 102, surface 109a side up, and the polishing pad shaft 104 is moved down until the pad head 104a comes into contact with the wafer surface 109a. Then the polishing solution 106 is jetted into between the pad head 104a and the wafer 109 by means of positive pressure action (discharging operation of the polishing solution pump) of the feeding and discharge mechanism 107. The polishing pad shaft 104 is rotated and moved back and forth horizontally to polish the wafer surface 109a. After the polishing is over, the feeding and discharge mechanism 107 is switched over to negative pressure action (suction action of the polishing solution pump) to suck and discharge the residues of the polishing solution 106 into the slurry fluid feeding and discharge passages 105 and 108. That is, care is taken so that the residues of the polishing solution 106 in the slurry fluid feeding and discharge passages 105 and 108 may not drop on the polished surface of the wafer, and that is effected by switching the passages 105 and 108 from the positive pressure mode to the negative pressure or dry mode.

The rotary joint 111 mounted in that surface polishing apparatus is constructed as follows. A joint block mounted on the pad shaft support block 103 and a rotator assembly fixed on the polishing pad shaft 104 are connected in a manner which permits relative rotation of the two. Within the joint block is formed a first fluid passage section which is connected to the slurry fluid feeding and discharge passage 105 on the non-rotary side. On the rotary side, a second fluid passage section is formed in the rotator assembly and is connected to the slurry feeding and discharging passage 108. A space formed between the opening ends of the two fluid passage sections is sealed by seal units placed between the relatively rotating faces of the joint block and the rotator assembly. An example of such seal is a one in which relatively rotating parts of the joint block and the rotator assembly have sealing faces to be brought into contact with and pressed against each other, or an end face contact-type mechanical seal placed therebetween.

The rotary joint 111 of such a design presents many problems. That is, the polishing solution 106 is a slurry fluid containing abrasive grains. Those abrasive grains tend to intrude into and be deposited between the sealing faces (in the case of a mechanical seal, the opposing end faces of the two seal rings), making it difficult to maintain good sealing performance for a long period. A solid-containing slurry fluid, the polishing solution 106 wears out the seal faces fast, shortening the life of the seal. In the case of a mechanical seal, because the metallic parts such as a spring to thrust one seal ring against the other seal ring are exposed in the fluid passage, the solid matter in the polishing solution 106 comes into contact with the metallic parts. As a result, the abrasive grains in the polishing solution 106 impact against and remove microscopic protrusions on the surface, thus generating metallic particles or dust. The metallic particles are adsorbed to matter in the slurry fluid, thereby generating metallic ions. In the case of a corrosive fluid, the metallic particles could be corroded. If such metallic particles and dust or particles removed from the seal faces by wear are mixed with the polishing solution 106 and blasted from the pad head 104a, it will naturally have undesirable effects on the polishing of the wafer surface 109a. The entry and deposition of abrasive grains between the seal faces, the wearing of the seal faces, and the like occur noticeably when slurry feeding and discharging passages 105 and 108 are switched over from positive pressure mode to negative pressure or dry mode as mentioned above. Especially in dry mode, the seal contact faces could be heated and subjected to seizure because of frictional heat. As the intrusion and deposition of abrasive grains, wear of sealing faces, etc. affect the sealing performance, polishing solution 106 can leak through the seal faces, contaminating the wafer surface 109a, or get into the bearing placed between the joint block and the rotator assembly, hindering rotation of polishing pad shaft 104. Good polishing then becomes difficult to achieve.

In recent years, meanwhile, higher precision surface polishing has been demanded in accordance with a recent trend toward high integration. To raise the precision of polishing a wafer surface 109a, it is desirable to check and know the state of the wafer surface 109a during polishing and to control the polishing conditions including the polishing rate of the pad head 104a. To be specific, it is preferable to provide a pad head 104a with an appropriate polished surface detector 110 such as a monitor at the place indicated by the broken line in FIG. 6. The state of the wafer surface 109a is checked by detector 110 in real-time so as to control the polishing conditions properly on the basis of the detected surface state. To mount such a polished surface detector 110 in the rotating member pad head 104a, however, it is necessary to form a wiring route from the power source unit (including a display unit such as a monitor display apparatus to show the finding detected by the polished surface condition detector 110 and an operation panel and control panel to control polishing condition) to the polished surface detector 110 through the rotary joint 111 in such a way that the electric wire will not be twisted or damaged. In the surface polishing apparatus using the aforesaid rotary joint 111, it is impossible to form such a wiring route and to provide a pad head 104a with a polished surface detector 110.

Those problems with the rotary joint 111 are encountered not only in the aforesaid surface polishing apparatus but are common to rotary equipment in which a slurry fluid-like polishing solution or a corrosive fluid has to be blown between component parts relatively rotating at a rate higher than a certain level. Such being the case, it has been strongly desired that a solution to the problems should be found, but the fact is that no rotary joint for fluids has been developed which exhibits a stabilized sealing performance for a long time.

SUMMARY OF THE INVENTION

Accordingly, it is an object of the present invention to provide a rotary joint for fluids which permits smooth flow, without leakage, of a slurry fluid such as a polishing solution or of a corrosive fluid through relatively rotating component parts, and allows a surface polishing apparatus, etc. to function properly as mentioned above.

It is another object of the present invention to provide a rotary joint for fluids which permits mounting on a fluid blasting assembly a desired electric instrument such as a monitor without causing troubles such as electric wire twisting, even if one section of a wiring route which runs from the power unit to the fluid blasting assembly is subjected to relative rotation, thus allowing the apparatus equipped with this rotary joint to function at a top performance level.

It is still another object of the present invention to provide a rotary joint for fluids which effectively prevents seal end faces 51a, 52a from being heated with resultant seizure and losing their sealing capability—the most serious of problems in a rotary joint—thereby ensuring a smooth flow of the slurry fluid for a still longer period.

It is a further object of the present invention to provide a rotary joint for fluids which keeps a surface polishing apparatus, etc. functioning properly, without causing such problems as wear particles and corrosion, when a slurry fluid such as polishing solution or corrosive fluid is allowed to flow, thereby improving the durability of this rotary join also.

It is still another further object of the present invention to provide a rotary joint for fluids which keeps the rotary connector unit from vibrating as the rotator assembly turns, thereby improving the durability of the rotary connector unit and extending the life of this rotary joint.

These objects are attained by a rotary joint for fluids comprising: a joint block; a rotator assembly mounted on a fluid blasting assembly which is forced to rotate, this rotator assembly held in the joint block in such a manner that the rotator assembly is allowed to rotate but unmovable in the axial direction; and a rotary connector unit made up of a connector portion on the stationary side connected to a power source unit and a connector portion on the rotary side electrically connected thereto such that the connector portion on the rotary side is allowed to rotate, further having the followings constructions.

A ring-shaped seal space sealed by a pair of seal units disposed side by side in the axial direction is formed between the outer circumference of the rotator assembly and the inner circumference of the joint block surrounding the rotator assembly concentrically. The joint block has a first fluid passage section therein with one end opening at the seal space. The rotator assembly has a second fluid passage section therein with one end opening at the seal space and the other end opening at a place where the fluid blasting assembly is attached. Thus the two fluid passages and the seal space form a line of fluid passages running through the joint block down to the fluid blasting assembly. In addition, the connector portion on the rotary side is mounted in the rotator assembly on the same axis of rotation. The wiring conduit that leads the electric wire connected to the connector portion on the rotary side to the fluid blasting assembly is formed so as not to cross the second fluid passage section. The connector portion on the stationary side is mounted in the joint block to form a wiring path leading from the power source unit to the fluid blasting assembly via the rotary connector. Each seal unit comprises: a rotary seal ring and a stationary seal ring both made of silicon carbide in which the rotary seal ring is fixed to one of the outer circumference of the rotator assembly and the inner circumference of the joint block while the stationary seal ring is held in the other one of these two and is movable in the axial direction; a thrusting member which, placed outside of the fluid passages, pushes the stationary seal ring against the rotary seal ring; and a stopper to prevent the stationary seal ring from rotating while allowing the ring to move in the axial direction. Furthermore, one of the opposing seal end faces of the two seal rings is tapered and sharp-edge-shaped so as to come into linear contact with the other, whereby the seal space may be sealed air-tight with the two seal end faces rotating relative to one another and sliding on one another. In case there is concern that the two seal end faces will become heated and subject to seizure or other such troubles, it is preferred to provide outside of the sealed space an area for supplying cooling water to cool the seal end faces of the respective seal units.

It is also desired to form the inside wall of the fluid passage line with at least one plastic material selected from among polyether ether ketone (PEEK), polyethersulfone (PES), and polycarbonate (PC). Alternatively, it is preferred to coat the inside wall of the fluid passage line with at least one plastic material selected from among polytetrafluoroethylene (PTFE), tetrafluoroethylene perfluoroalkoxy vinyl ether copolymer (PFA), and fluorinated ethylene propylene copolymer (FEP).

In another embodiment, the connector portion on the rotary side is formed from a casing and a first connector fixed therein, while the connector portion on the stationary side comprises a second connector rotatably mounted in the casing. At least part of the casing is fitted into a first housing space formed in the rotary assembly, and a rotation stopper member keeps the casing and the rotator assembly from relatively rotating. A second housing space may be formed in the rotator assembly that communicates with the first housing space and the wiring conduit, with a whole of the first connector fitted into the second housing space.

DESCRIPTION OF PREFERRED EMBODIMENTS

FIGS. 1 to 4 show a preferred embodiment of the rotary joint for fluids according to the present invention.

This embodiment concerns an example of a rotary joint of the present invention to be installed in an apparatus for polishing the surfaces of silicon wafers by CMP techniques. It is understood that as used herein, terms such as "upper" or "above", "lower" or "under", and "horizontal" or "vertical" are adjectives applicable only on the drawings in FIGS. 1 and 3.

The surface polishing apparatus presented herein is the same as that described above in construction as shown in FIGS. 3 and 4. That is, the apparatus comprises: a rotary table 102 that rotates horizontally; a pad shaft support block 103 which moves back and forth and up and down; a polishing pad shaft 104 or fluid blasting assembly which, held by the pad shaft support block 103, is forced to rotate; a slurry fluid feeding and discharge passage 105 formed on the non-rotary side in the pad shaft support block 103; a feeding and discharge mechanism 107 connected to a slurry fluid feeding and discharge passage 105 supplying a polishing solution 106; a slurry fluid feeding and discharge passage 108 on the rotary side which runs through the polishing pad shaft 104 and opens under a pad head 104*9*; and a rotary joint 101 which, provided between the pad shaft support block 103 and the polishing pad shaft 104, connects the two slurry fluid feeding and discharge passages 105 and 108 in a way that the two passages 105 and 108 communicate with each other while rotating relative to one another. The pad head 104*a* is provided with a polished surface detector 110 such as a monitor unit to watch and detect the polished surface on a real-time basis so that the polishing conditions such as polishing rate of the pad head 104*a* may be controlled, depending upon the state of the wafer surface during polishing.

The rotary joint 101 embodying the present invention comprises: a joint block 1 to be mounted on the pad shaft support block 103; a rotator assembly 2 to be mounted on the polishing pad shaft 104; a rotary connector unit 4 made up of a connector portion 42 on the stationary side connected to the power source unit (including a display unit such as a monitor display apparatus to monitor the findings detected by the polished surface condition detector 110 and the operation panel and control panel to control the polishing conditions) and a case 40 and connector portion 41 on the rotary side electrically connected to the connector portion 42 and linked thereto such that the connector portion 41 and case 40 are rotatable; a pair of seal units, that is, an upper seal unit 5 and a lower seal unit 5, provided between the joint block 1 and the rotator assembly 2; a cooling unit 6 to cool the seal end faces of each seal unit 5; and a fluid passage line 7 formed in the joint block 1 and the rotator assembly 2.

Figure 1:
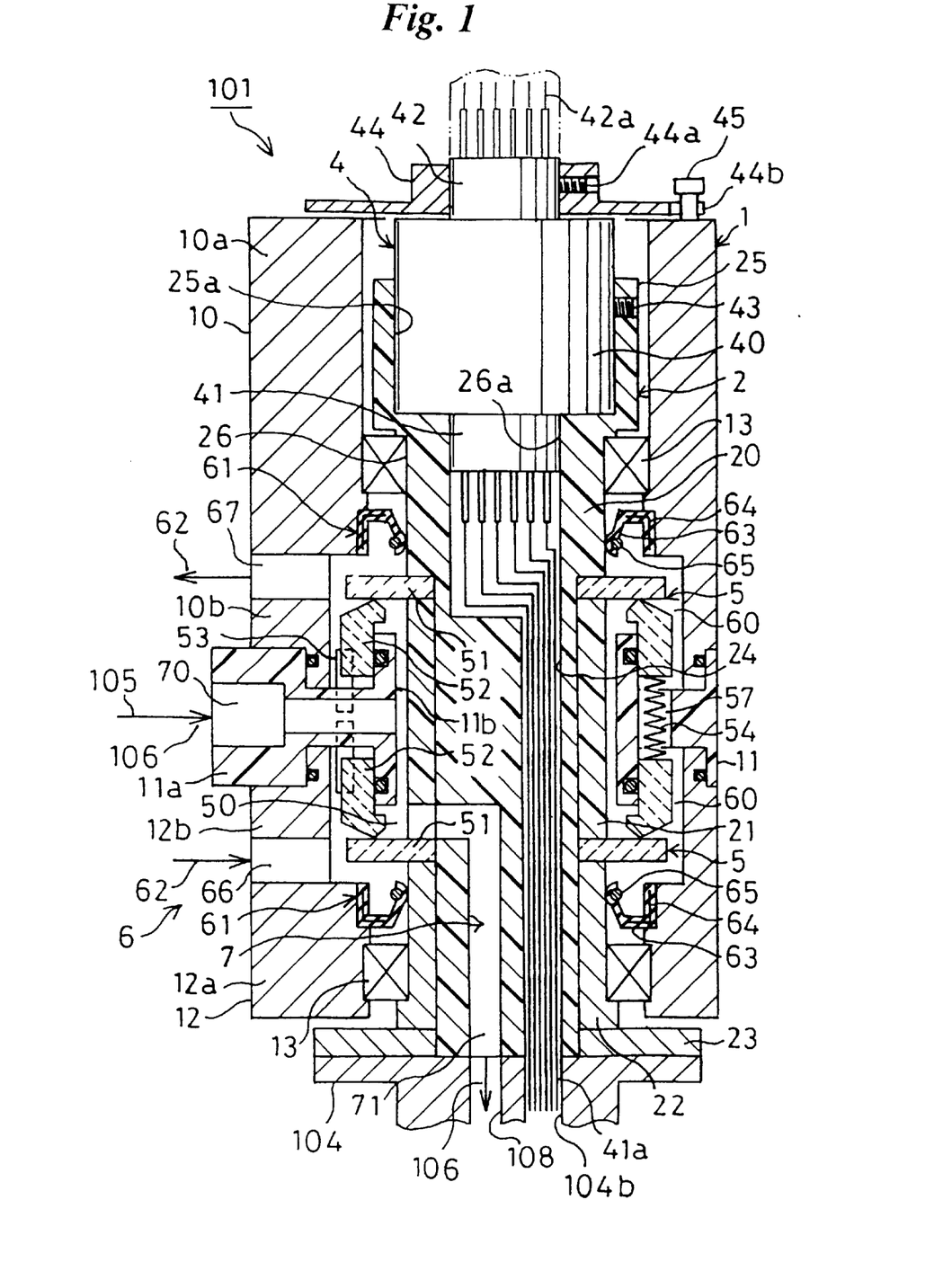
FIG. 1 is a vertical, sectional view of one example of a rotary joint for fluids embodying the present invention.

The joint block 1 is made up of three parts 10, 11, and 12 connected integrally and arranged vertically as shown in FIG. 1. The upper first part 10 and the lower or third part 12 are cylindrical in shape and formed out of support portions 10*a* and 12*a*, respectively, both provided with inner circumferential surfaces and connecting sections 10*b* and 12*b*, respectively, both with circumferential surfaces concentric with, but larger in diameter than, the inner circumferences of the support portions 10*a* and 12*a*, respectively. It is noted that the support portions 10*a* and 12*a* are identical in diameter to the inner circumference, as are the connecting sections 10*b* and 12*b*. The middle or second part 11 is formed out of a ring-formed wall portion 11*a* coupling the connecting sections 10*b* and 12*b* and a cylindrical retainer portion 11*b* extending up and down from the inner circumferential surface of the wall portion 11*a*. The retainer portion 11*b* is concentric with the circumference of the connecting sections 10*b* and 12*b*, and is designed so that the outside diameter is smaller than the inside diameter of the connecting sections 10*b* and 12*b* by a specific amount. Of those component parts of the joint unit, the second part 11 is exposed to the polishing solution 106, as will be described below. At least this second part 11 is formed of a plastic material for machine parts, which is excellent in dimensional stability and thermal resistance and which does not generate particles in contact with the abrasive grains, such as PEEK, PES, or PC. In the present example, PEEK is used. On the other hand, no such consideration is needed for the other constituent parts 10 and 12 of the joint unit, and any material may be selected. In the present example, those parts are made of a stainless steel with a JIS standards designation of SUS 304.

The rotator assembly 2 is formed out of a cylindrical main part 20; a retainer sleeve 21 fit on and fixed to a middle portion of the main part 20; a fixing sleeve 22 fit on and fixed to the main part 20 at the lower portion; and a flange 23 screwed to the main part 20 at the lower end.

The upper end of the main part 20 comprises a first cylinder 25 and a second cylinder 26 thereunder. The two cylinders 25 and 26 are concentric with the axis of rotation of the rotator assembly 2. The inside diameter of the first cylinder 25 is so designed in accordance with the outside diameter of a casing 40 of the rotary connector unit 4 that the casing 40 can be tightly fit into the interior space of the first cylinder 25 or a first housing space 25*a*. The rotary connector unit 4 will be described in more detail below. It is desired that the depth (vertical length) of the first housing space 25*a* should be set not shorter than one half of the vertical length of the casing 40 so that at least a lower half of the casing 40 is housed. The second cylinder 26 is designed to be smaller than the first cylinder 25 in diameter. The inside diameter of the second cylinder 26 is set in accordance with the outside diameter of the connector 42 so that a first connector 41 of the rotary connector unit 4 (which will be detailed below) may be just fit into the interior space of the second cylinder 26, or a second housing space 26*a*. The depth (vertical length) of the second housing space 26*a* is set so as to house the whole of the connector portion 41.

The rotator assembly 2 is rotatably held in the joint block in such a state that the component parts of the rotator assembly (that is, the main part 20 and the two sleeves 21 and 22) except for the flange 23 are place inside the joint block 1 with two bearings 13 and 13 installed—one between the second cylinder 26 of the main part 20 and the support portion 10*a* of the joint block 1, and the other between the clamping sleeve 22 and the support portion 12*a*. The flange 23 is fixed to the polishing pad shaft 104 so that the rotator is forced to rotate as the polishing pad shaft 104 turns. Of those component parts of the rotary assembly, at least the main part 20 and the retainer sleeve 21 which come into contact with the polishing solution 106 (which will be described in detail below) are formed of a plastic material for machine parts, such as that used for the second part 11 of the joint block 1. Examples of such plastic materials are PEEK, PES, and PC. These have excellent dimensional stability and thermal resistance and further do not degenerate in contact with abrasive grains. In the present example, PEEK is adopted. On the other hand, any material may be selected for the other constituent parts 22 and 23 of the rotator assembly 2 that are not subject to such considerations. In the present example, those parts are made of a stainless steel with a JIS standards designation of SUS 304.

The rotary connector unit 4 is a known one, and is made up of a connector portion on the rotary side including a casing 40 and a first connector 41 fixed thereunder, and a connector portion on the stationary side comprising a second connector rotatably mounted on the casing 40, arranged so that each electric wire 41a connected to the first connector 41 is kept in constant contact with each corresponding electric wire 42a connected to the second connector 42 while the connectors 41 and 42 rotate relative to one another. The casing 40 and the two connectors 41 and 42 are circular, with a center which is equal to the axis of relative rotation of the connector 41 and 42. The two connectors 41 and 42 are smaller than the casing 40 in outside diameter. The electric wire 41a of the first connector 41 is connected to the polished surface detector 110. The electric wire 42a of the second connector 42 is connected to a power source unit 3 including a control panel. The casing 40 and the first connector 41 are housed in the first housing space 25a and the second housing space 26a of the rotator assembly 2, respectively, in a firmly fitted state. The casing 40 is fixed in the rotator assembly 2 by means of a set screw 43, a rotation stopper member screwed into the first cylinder 25 such that the casing 40 is not allowed to rotate relative to the rotator assembly 2. The second connector 42 has a bracket 44 fixed thereon by a set screw 44a. The second connector 42 is kept from rotating in relation to the joint block 1 with a stopper pin 45 such as a bolt screwed in the upper end of the joint block through an opening 44b made at the periphery of the bracket 44. One or more than one opening 44b and stopper pin 45 may be provided. Engagement of the opening 44b and the stopper pin 45 is merely to prevent the second connector 42 and the joint block 1 from rotating in relation to each other. It is needless to say that when shift, due to vibration of the rotary assembly 2, of the axis of the rotary assembly 2 and the rotary side connector portion 40, 41 from the axis of the second connector 42 of the stationary connector portion occurs, the second connector 42 may be moved to reverse such shift. In the main part 20, there is formed a wiring conduit 24 running from the first and second housing spaces 25a and 26a to the polishing pad shaft mounting section, that is, the lower end of the rotator assembly 2. In the polishing pad shaft 104, also, a wiring conduit 104b is formed that runs from the lower end of the wiring conduit 24 to the polished surface detector 110. Thus the electric wire 41a connected to the first connector 41 can be led to the polished surface detector 110 through the two wiring conduits 24 and 104b. Therefore connecting the electric wire 41a to the polished surface detector 110 forms a wiring path from the power source unit 3 to the polished surface detector 110 through the rotary members, that is, the rotator assembly 2 and the polishing pad shaft 104. That way, the polished surface detector 110 is electrically connected to the power source unit 3 without twisting the electric wire 41a running through the rotary members 2 and 104 while the polishing pad shaft 104 turns.

Figure 2:
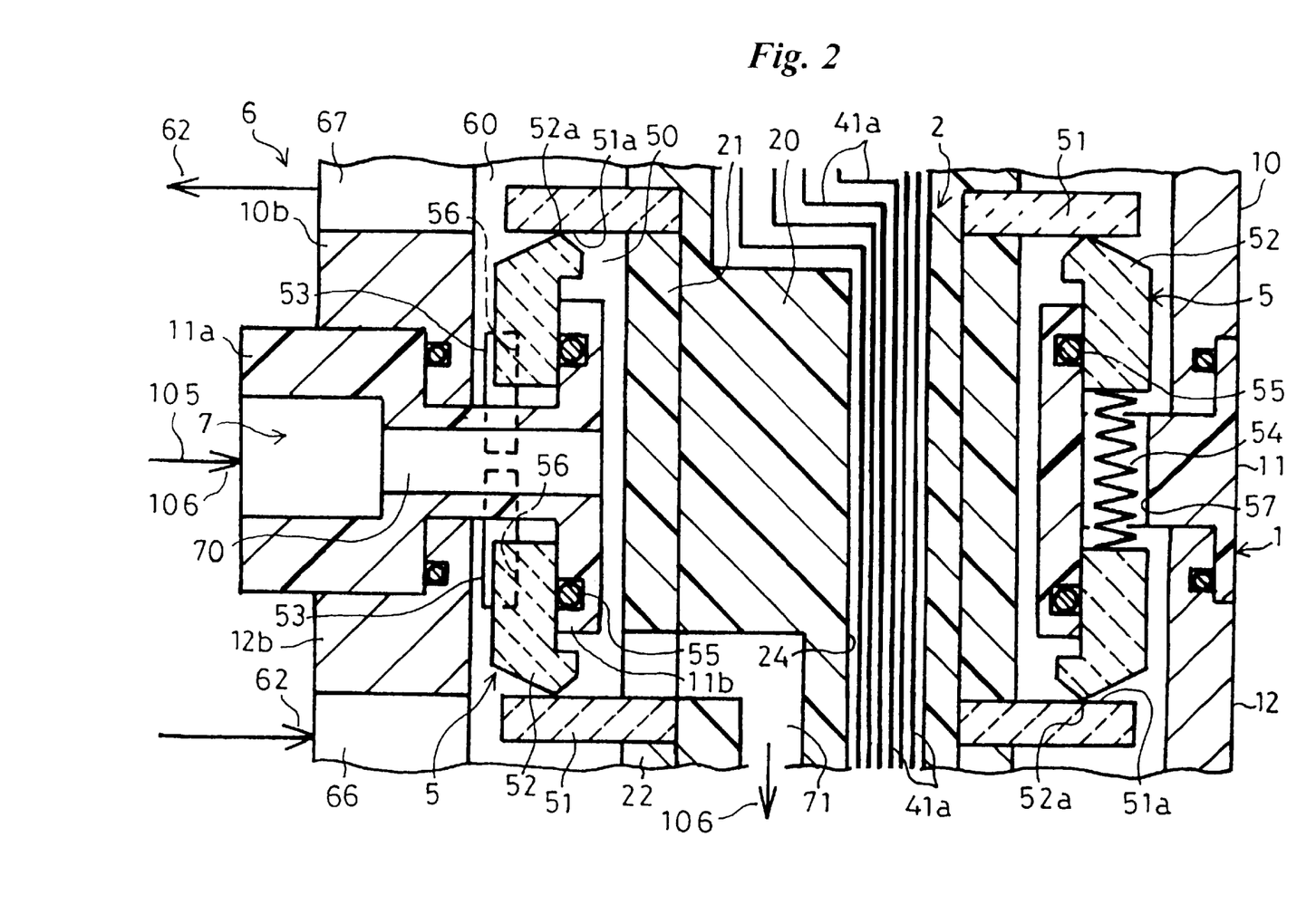
FIG. 2 is an enlarged view of the core part of FIG. 1.

The seal units 5 and 5 are disposed apart in the axial direction between the retainer sleeve 21 or the outer circumference of the rotator assembly 2 and the retainer portion 11b of the second part 11 or the inner circumference of the joint block 1 surrounding the retainer sleeve 21 concentrically, as shown in FIGS. 1 and 2. Between those inner and outer circumferences is formed a ring shaped seal space 50 with the two ends in the axial direction sealed.

Each seal unit 5 comprises a rotary seal ring 51 made of silicon carbide fixed in the outer circumference of the rotator assembly 2; a stationary seal ring 52 made of silicon carbide held in the inner circumference of the joint block 1 and movable in the axial direction; a stopper mechanism 53 provided outside of the seal space 50 and engaging the stationary seal ring 52 for keeping the stationary seal ring 52 from rotating while allowing the ring 52 to move in the axial direction; and a thrusting mechanism 54 provided outside of the seal space 50 to press the stationary seal ring 52 toward the rotary seal ring 51.

The rotary seal rings 51 and 51 of the seal units 5 and 5 are fixed opposite to each other with the retainer sleeve 21 provided therebetween. The two rotary seal rings 51 and 51 are held and fixed by pressing the two sleeves 21, 22 with the flange 23 screwed at the lower end of the main part 20 being tightened. The opposing end faces of the two rotary seal rings 51 and 51 form rotary seal end faces 51a and 51a or smooth surfaces perpendicular to the axis of the rotator assembly 2.

Each stationary seal ring 52 of the seal unit 5 is held in the outer circumference of the retainer section 11b of the second part 11 via an O-ring 55 such that the seal ring 52 is movable in the axial direction, as shown in FIGS. 1 and 2. The stationary seal end face 52a is so tapered and edge-shaped on the seal end face opposite to the rotary seal end face 51a to form a ring-shaped contact face which comes into linear contact with rotary seal end face 51a. The diameter of the stationary seal end face 52a is set to nearly equal to the outside diameter of the retainer portion 11b.

The stopper mechanism of the seal unit 5 is made up of one or more stopper pins 53 embedded in wall portion 11a of the second part 11 of joint block 1, as shown in FIG. 2. This stopper pin 53 engages with an engaging hole 56 provided in the outer circumference of the stationary seal ring 52 to keep the stationary seal ring 52 from rotating in relation with the joint block 1 while allowing the ring 52 to be movable in the axial direction.

The thrusting mechanism in the seal unit 5 comprises a plurality of compressed springs 54 placed between the opposing end faces of the two stationary seal rings 52 and 52 at equal intervals in the circumferential direction. Those springs press the stationary seal ring 52 against the rotary seal ring 51 so that the stationary seal end face 52a is forced into contact with the rotary seal end face 51a. The springs 54 are placed and held in spring retaining holes 57 that pass through the wall portion 11a of the second part 11 in the vertical direction.

Thus the seal units 5 and 5 work to seal in the same way as the end face contact type mechanical seal mentioned above. That is, the seal end faces 51a and 52a come into relatively rotating and sliding contact with each other as the rotator assembly 2 turns, to keep the seal space 50 sealed at the two ends in the vertical direction. The dimensions of the components including the diameter of the tapered stationary seal end face 52a are set so that when the relation of pressures inside and outside the seal space 50 is reversed as the polishing solution feeding and discharge mechanism 107 is switched over to the negative pressure mode (for example when the fluid passage 7 is changed to the negative pressure or dry mode), the seal end faces 51a and 52a will maintain an effective sealing function. That is achieved as by, for instance, bringing the balance ratio to zero.

The cooling unit 6 is formed in a space 60 between the joint block 1 and the rotator assembly 2 but outside the seal space 50 and sealed with the seal units 5 and 5 and a pair of seal members 61 and 61, as shown in FIGS. 1 and 2. Into this cooling water space 60 is fed the cooling water 62 to cool the contact portions of the seal end faces 51a and 52a in the seal unit 5. The seal member 61, placed between the bearing 13 and the rotary seal ring 51, seals a space between the opposing circumferential surfaces of the joint block 1 and the rotary assembly 2. In the present example, the seal member 61 is composed of a seal ring 63 made of an elastic material such as rubber, held in the inner circumferential surface of the join block 1 (in the inner circumferential surface of the support portion 10a and 12a of the first and third parts) and pressed against the outer circumferential surface of the rotator assembly 2 (the outer circumferential surface of the end portion of the main part 20 or the outer circumferential surface of the retainer sleeve 22); a reinforcing metal member 64 embedded in the seal ring 63; and a garter spring 65 to keep an inner lip of the seal ring in contact with the rotator assembly. The joint block is provided with an inlet 66 and an outlet 67 for cooling water 62 at the portions corresponding to the cooling water space 60 (in the connecting sections 10b and 12b in the first and third parts 10 and 12). The cooling water 62 is fed continuously into the cooling supplying space 60 through the inlet 63 to cool the seal end faces 51a and 52a of the seal unit 5.

Figure 3:
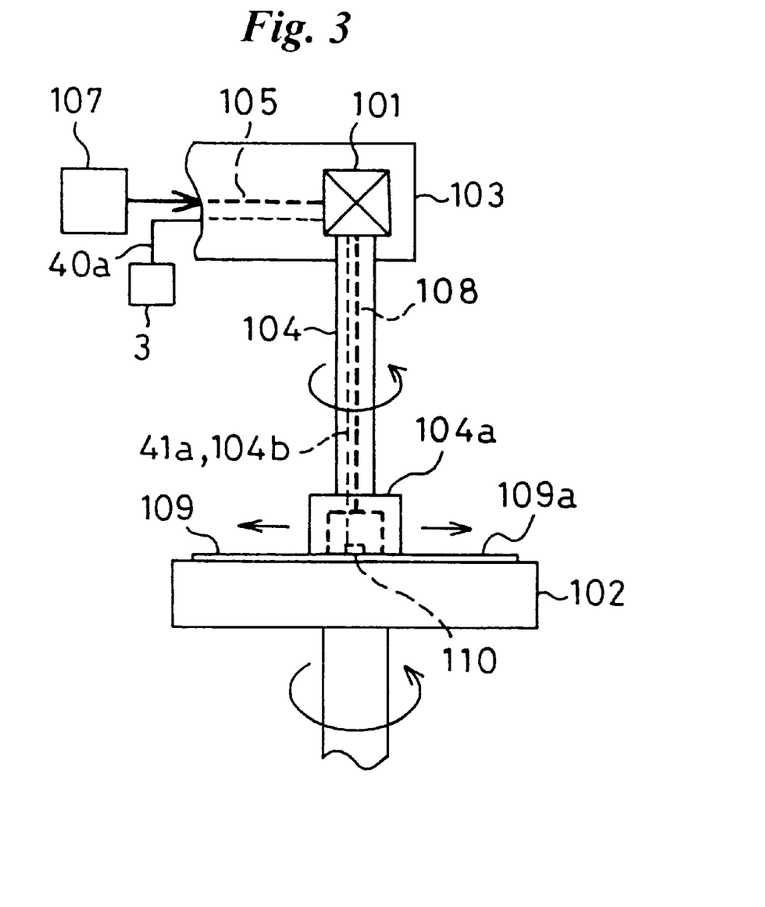
FIG. 3 is a side view of one example of a surface polishing apparatus with the rotary join installed therein.
Figure 4:
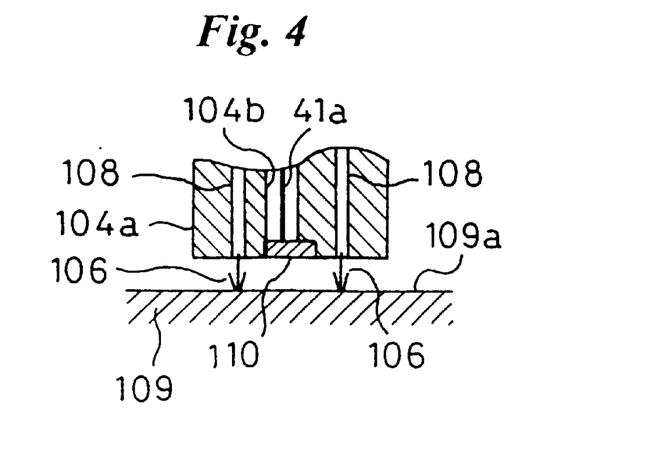
FIG. 4 is a vertical, sectional view showing the surface polishing apparatus.

The fluid passage 7 is a continuous path, made up of a first fluid passage section 70 formed in the joint block 1 and a second fluid passage section 71 formed in the rotator assembly 2, which communicate with each other via the seal space 50 sealed with the seal units 5 and 5, as shown in FIGS. 1 to 3. Passage 7 is connected to the slurry fluid feeding and discharging passages 105 and 108 provided in pad shaft support block 103 and polishing pad shaft 104, respectively.

In other words, the first fluid passage section 70 is formed through the wall portion 11a of the second part 11 in the radial direction, as shown in FIGS. 1 and 2. One end of the first fluid passage section 70 opens at the seal space 50. The other end of the passage 70 opens at the outer circumferential surface of the second part 11, and is connected to the slurry fluid feeding and discharge passage 105 on the non-rotary side of the pad shaft support block 103. In this connection, the first fluid passage section 70 in the second part 11 is formed and located so as not to interfere with the spring retaining holes 57 and the holes to receive the stopper pin 53.

The second fluid passage section 71 is formed through the main part 20 of the rotator assembly 2 and the retainer sleeve 21, as shown in FIGS. 1 and 2. One end of the second fluid passage section 71 opens at the seal space 50. The other end opens at the lower portion of the main part 20 and communicates with the slurry fluid feeding and discharge passage 108 on the rotary side of polishing pad shaft 104 on which the rotator assembly 2 is mounted. The second fluid passage section 71 in the rotator assembly 2 is formed and located so as not to cross wiring conduit 24.

A surface polishing apparatus in which the rotary joint 101 thus constructed is mounted can feed and discharge the polishing solution 106 without causing such problems as described above. The polished surface detector 110 detects the state of the polished wafer surface 109a on a real-time basis. On the basis of detected results, the polishing conditions can be controlled properly. Thus the surface of the silicon wafer 109 can be polished satisfactorily using this surface polishing apparatus.

At the time of polishing with the polishing pad shaft 104 being rotated, the polishing solution 106 sent out from the feeding and discharge mechanism 107 is allowed to flow through the slurry fluid feeding and discharge passage 105 on the non-rotary side of the pad shaft support block 103 and then through the fluid passage 7 of the rotary joint 101 to the slurry fluid feeding and discharge passage 108 on the rotary side of the polishing pad shaft 104. In fluid passage 7, the first fluid passage section 70 in the joint block 1 and the second fluid passage section 71 in the rotator assembly 2 rotate relative to one another as the polishing pad shaft 104 turns. But the seal space 50 connecting the two passage sections 70 and 71 is sealed with seal rings 51 and 52 of the seal unit 5, which slidingly rotate relative to one another. The polishing solution 106 flows through the fluid passage 7 without leaking from between two passage sections 70 and 71.

There is no concern that sticky substances in the polishing solution 106 will adhere and deposit where the two seal rings 51 and 52 come into contact with each other. That is, since seal end face 52a of the second seal ring 52 is tapered and edge-shaped, the sticky substances will be scraped and removed by seal end face 52a. Thus, there is no possibility that the solid matter or abrasive grains in the polishing solution 106 will intrude and deposit between the two seal end faces 51a and 52a. Therefore the two seal end faces 51a and 52a are kept in proper contact with each other without deterioration in their sealing performance due to insufficient contact. Furthermore there is no possibility that seal end faces 51a and 52a, which are cooled by the cooling water circulated through cooling water space 60, will heat up and seize.

It is also noted that two seal rings 51 and 52, made of a very hard material silicon carbide, will not wear and generate particles in contact of the seal rings 51 and 52, unlike metal or carbon seal rings or a combination of a seal ring made of a hard material like silicon carbide and a seal ring of a soft material such as carbon, as in the ordinary end face contact type mechanical seal. Therefore, there is no possibility that wear dust or particles will be mixed in a polishing solution 106.

Furthermore, the inside wall of fluid passage 7 is formed of a material that will not generate particles such as wear dust in contact with the polishing solution 106 (abrasive grains in particular). That is, the portion (the second part 11) of the joint block where the first fluid passage section of 70 is formed and the portions (main part 20 and retainer sleeve 21) of the rotator assembly where the second fluid passage section 71 is formed are all made of a plastic material for machine parts, such as PEEK, PES, or PC, which is excellent in dimensional stability and thermal resistance and further does not generate particles or dust in contact with abrasive grains. In the present example, PEEK is used in particular. Also, the seal space 50 which connects the two fluid passage sections 70 and 71 is enclosed with the inner circumferential surface of the retainer portion 11b of the second part 11 and the outer circumferential surface of the retainer sleeve 22, which form fluid passage sections 70 and 71, respectively, and the inner circumferential surfaces of the seal rings 51 and 52 all made of silicon carbide, which is resistant to wear by abrasive grains. That precludes the possibility of producing dust particles by wearing down the walls of the fluid passage 7 in contact with abrasive grains while a polishing solution 106 flows therethrough.

The stopper mechanism or the stopper pin 53 and the thrusting mechanism or the spring 54 are indispensable to secure a high sealing performance by keeping the relatively rotating seal end faces 51a and 52a in contact under a proper pressure. If those component parts made of metal were placed inside fluid passage 7, metal dust or particles produced by abrasive grains could be mixed into the polishing solution 106. In the rotary joint of the present invention, however, the two mechanisms 53 and 54 are provided outside the seal space 50, and no metallic parts that are subjected to wearing in contact with abrasive grains, or which hinder the flow of the polishing solution 106, are used in fluid passage 7. That is, there is no possibility that fine metallic particles will be produced by the flow of a polishing solution 106 in fluid passage 7.

For that reason, the polishing of wafer surface 109a can be carried out with satisfactory results, with the polishing solution 106 passing through the wellsealed fluid passage 7, without being mixed with fine particles such as wear dust, and then jetting between pad head 104a and silicon wafer 109 from the slurry fluid feeding and discharge passage 108 on the rotary side.

Another point to note is that the wiring path between the power unit 3 and the polished surface detector 110 is divided into a stationary section (an electric wire 42a connecting the power unit 3 and the second connector 42) and a rotary section (an electric wire 41a connecting the first connector 41 and the polished surface detector 110) with the rotary joint 101 placed therebetween. The two sections are connected by the rotary connector unit 4 such that the two sections are rotatable relative to one another, whereby there is no twisting of the electric wire 41a when the rotary section rotates as the polishing pad shaft 104 turns. That permits mounting the polished surface detector 110, an electric instrument, in the pad head 104a that rotates, which makes it possible to monitor the polishing state of the wafer surface 109a and to control the polishing conditions properly. Thus a high-precision surface polishing will be possible.

Still another feature of the present invention is that at least the lower half of the casing 40 of rotary connector unit 4 is fit in the first cylinder 25 of the rotator assembly 2 with the casing being kept by the set screw 43 from relatively rotating. Hence, the portion near the center of gravity of the rotary connector unit 4 is held in the rotator assembly 2. That can definitely prevent vibration of the rotary connector unit 4 due to rotation of rotator assembly 2, unlike the system in which the first connector 41 alone is held in the rotator assembly 2 (the portion distant from the center of gravity of the rotary connector unit 4 is held in the rotator assembly 2). Load due to such vibration therefore does not lessen the durability of rotary connector unit 4. Furthermore the first connector 41 of the rotary connector unit 4 is fit and held in the second cylinder 26 of rotator assembly 2. That contributes to keeping rotary connector unit 4 from vibrating when rotator assembly 2 turns.

When the polishing work is complete, fluid passage 7 is switched over from a positive pressure mode to a negative pressure mode or a dry mode. In negative pressure mode operation, too, there is no possibility that seizure due to contact heat will be inflicted on seal end faces 51a and 52a because the seal end faces are merely in linear contact with each other, and besides the seal rings 51 and 52 are cooled with cooling water 62.

It is understood that the present invention is not limited to the embodiment just described but may be changed or modified without departing from the basic principles of the present invention.

That is, it is also possible, needless to say, to apply the rotary joint 101 of the present invention to CMP apparatuses different from that shown in FIG. 3. An example of such CMP apparatuses is an apparatus in which the rotary table constitutes the polishing pad jetting the polishing solution. The surface of silicon wafer is placed on and in contact with that pad table. The rotary joint 101 of the present invention is also applicable to a variety of apparatuses in which slurry fluids other than a polishing solution 106 are used. In such apparatuses, the fluid blasting assembly is provided with an electric, electronic, optical, laser instrument, or the like, depending on the purpose of operation, in place of the polished surface detector 110. Also, as an alternative to the electric wires 41a and 42a, a variety of transmission media may be used depending on the purpose of operation, which include a metal cable and an optical cable (optical fiber). In that case, a suitable rotary connector unit 4 is selected according to the transmission medium.

The rotary joint 101 of the present invention also can be adopted in rotary equipment handling corrosive fluids. That is, the material for the walls forming the fluid passage 7 may be freely changed except for the wall of silicon carbide formed on seal rings 51 and 52. For equipment handling a corrosive fluid, a material that is resistant to corrosion can be selected. Silicon carbide, the material forming the seal rings 51 and 52, is too hard to be worn in contact with abrasive grains and is excellent in corrosion resistance and other properties, too. If, therefore, the parts of the fluid passage walls other than the section formed by seal rings 51 and 52 are made of corrosion-resistant materials, then the rotary joint 101 may be used even in situations in which corrosive fluids are handled. In such situations, needless to say, a stopper pin 53 and spring 54 that are not positioned in fluid passage 7 do not have to be made of a corrosion-resistant material. That eliminates the necessity of making the stopper pin 53, spring 54, and other parts of a material that could compromise the intended functions thereof just in order to secure corrosion resistance.

In case the fluid passage walls (except for the sections formed with seal rings 51 and 52) are to be formed of materials which are suitable for the properties of the fluid, either of the following approaches is possible. That is, the sections forming the fluid passage (in the above example, the second part 11 of the joint block 1 and the main part 20 and the retainer sleeve 21 of the rotator assembly 2) may all be made of a suitable material. Or, the fluid passage walls only may be covered or coated with that material. In case, for example, the rotary joint 101 shown in FIGS. 1 and 2 is to be used in an apparatus handling a corrosive fluid, second part 11 of joint block 1, main part 20, and retainer sleeve 21 of the rotator assembly 2 are made of a suitable material such as, for example, stainless steel SUS 316 and SUS 304 under the JIS standards designation. The inner circumferential surfaces of the fluid passage sections 70 and 71 and the surfaces (in contact with the seal space 50) of the second part 11 and the retainer sleeve 21 may be coated with a corrosion-resistant material. Among such materials are fluororesins such as PTFE, PFA, and FEP.

Figure 2A:
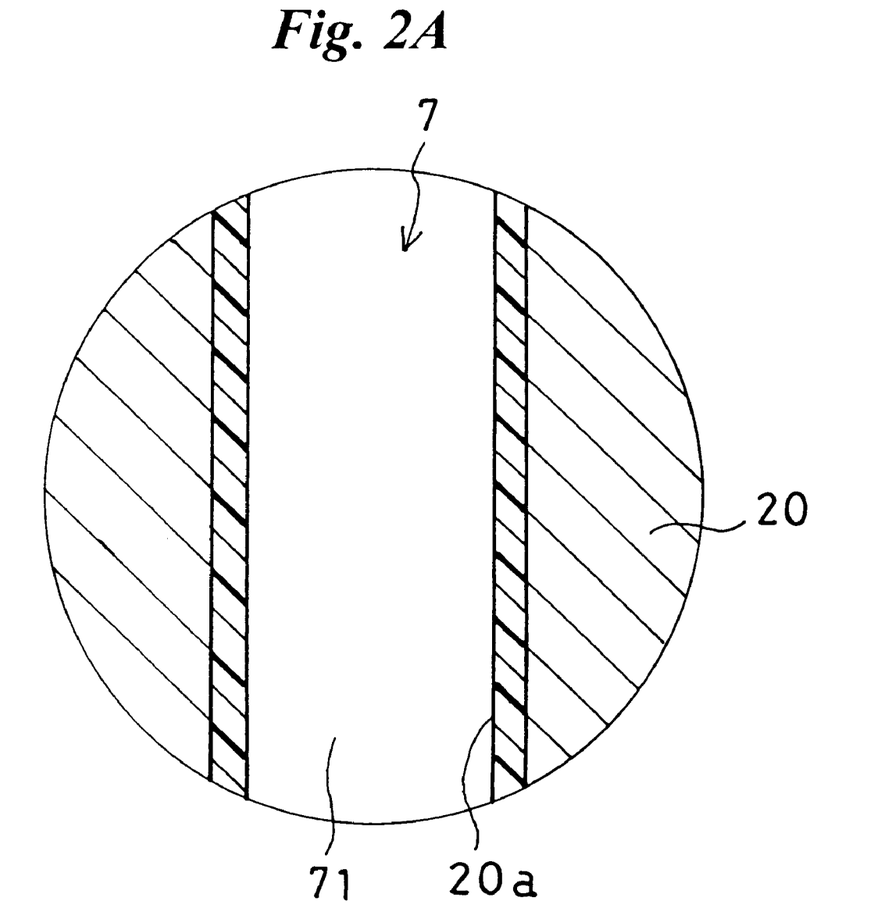
FIG. 2A illustrates an example in which the inside wall of a second fluid passage is formed with a coating.

FIG. 2A illustrates an example in which the inside wall of the second fluid passage section 71 is formed by a coating 20a of PTFE coated onto the surface of main part 20, made of stainless steel.

That is, in case the inner walls of the fluid passage are made up of a plurality of members which form the passage (in the above case, for example, the second fluid passage section 71 is made up of the main part 20 and the retainer sleeve 21), either of the following will do. That is, all the members which form the passage may be made of one kind of material. Or different materials may be used for each member forming the passage. Or some of the members may be made of a material which is different from the ones for the other members. The preferred materials are plastic materials for machine parts, especially PEEK, PES, or PC. Similarly, in case the inner walls of the fluid passage or the fluid passage wall surfaces are made up of a plurality of passage wall sections (in the above example, the inner walls of the second fluid passage section 71 are formed out of the inner circumferential surface of the section passing through the main part 20 and that of the section passing through the retainer sleeve 21), those inner walls may be coated in either of the following. That is, all the passage wall sections are coated with one material. Or a different coating material may be used for each of the passage wall sections. As coating materials, it is preferred to use fluororesins materials such as PTFE, PFA, and FEP.

The seal unit 5 may be designed in any way except that care should be taken not to place the stopper mechanism 53 and the thrusting mechanism 54 in the fluid passage 7. For example, the rotary seal ring 51 may be provided in the joint block 1 while the stationary seal ring 52 (and auxiliary parts 53 and 54) may be placed on the rotator assembly 2. Also the rotary seal end face 51*a* may be in a sharp-edge-shaped form.

As alternative to the rotation stopper set screw 43, other means such as key and spline may freely be used to keep the casing 40 of the rotary connector unit 4 and the rotator assembly 2 from rotating relative to one another.

What is claimed is:

1. A rotary joint for fluids comprising: a joint block; a rotator assembly mounted on a fluid blasting assembly which is forced to rotate and supported in the joint block such that the rotator assembly is allowed to rotate, but is unmovable in the axial direction; and a rotary connector unit made up of a connector portion on a stationary side connected to a power source unit and a connector portion on a rotary side electrically connected thereto such that the connector portion on said rotary side is allowed to rotate relative to said connector portion on said stationary side, wherein a ring-shaped seal space, sealed by a pair of seal units disposed apart in the axial direction, is formed between an outer circumference of the rotator assembly and an inner circumference of the joint block surrounding the rotator assembly concentrically, wherein, in said joint block is formed a first fluid passage section with one end opening at the seal space and in said rotator assembly is formed a second fluid passage section with one end opening at the seal space and the other end opening at a place where said fluid blasting assembly is attached, whereby said two fluid passages and said seal space form a continuous route of fluid passages running through the joint block down to the fluid blasting assembly, wherein the connector portion on said rotary side is mounted in the rotator assembly with said connector portion on said rotary side and the rotator assembly sharing the same axis of rotation, a wiring conduit that leads electric wire connected to the connector portion on said rotary side to said fluid blasting assembly is formed so as not to cross the second fluid passage section and the connector assembly on said stationary side is mounted in the joint block to form a wiring path leading from the power source unit to said fluid blasting assembly via the rotary connector, wherein each of said seal units comprises: a rotary seal ring and a stationary seal ring, both made of silicon carbide, in which the rotary seal ring is fixed to the outer circumference of the rotary assembly and the stationary seal ring is held in the joint block and is movable in the axial direction; and a thrusting member which, placed outside of the fluid passages, urges the stationary seal ring against the rotary seal ring; and a stopper, placed outside of the fluid passages, to prevent the stationary seal ring from rotating while allowing the stationary seal ring to move in the axial direction, and wherein said rotary seal ring and stationary seal ring have opposing seal end faces and opposing seal end faces of the rotary seal ring and stationary seal ring are tapered and sharp-edge-shaped so as to come in linear contact with the other, whereby a sealed space sealed by the rotary seal ring and the stationary seal ring may be sealed air-tight with the two seal end faces of the seal rings rotating relative to one another and sliding on one another.

2. The rotary joint for fluids as claimed in claim 1, wherein a space for supplying a cooling water to cool contact portions of the seal end faces of the respective seal units is formed in an area between an outer circumferential surface of the rotator assembly and an inner circumferential surface of the joint block and outside said sealed space.

3. The rotary joint for fluids as claimed in claim 1, wherein the inside walls of the continuous route of the fluid passages are formed of at least one machine part, said machine part being a plastic selected from the group of plastics consisting of polyether ether ketone, polyethersulfone and polycarbonate.

4. The rotary joint for fluids as claimed in claim 1, wherein the inside walls of the continuous route of the fluid passage are coated with at least one corrosion-resistant material selected from the group of materials consisting of polytetrafluoroethylene, perfluoroalkoxy vinyl ether polymer and fluorinated ethylene propylene copolymer.

5. The rotary joint for fluids as claimed in claim 1, wherein said connector portion on said rotary side is made up of a casing and a first connector fixed therein, said connector portion on said stationary side comprises a second connector rotatably mounted in the casing, and at least part of said casing is fit in a first housing space formed in the rotator assembly with said casing and said rotator assembly being prevented from rotating in relation to each other by a rotation stopper member provided on said casing.

6. The rotary joint for fluids as claimed in claim 5, wherein a second housing space communicating with the first housing space and the wiring conduit is formed in the rotator assembly, and a whole of said first connector is fit into said second housing space.

* * * * *